United States Patent
McKnight

[15] 3,678,601
[45] July 25, 1972

[54] VISUAL TEACHING AIR FOR FIXED-BASE VEHICLE TRAINER

[72] Inventor: Robert A. McKnight, Binghamton, N.Y.
[73] Assignee: The Singer Company, New York, N.Y.
[22] Filed: Nov. 10, 1969
[21] Appl. No.: 875,374

[52] U.S. Cl. ............................................... 35/12 N, 35/10.2
[51] Int. Cl. ........................................ B64g 7/00, G09b 9/08
[58] Field of Search ........................................ 35/12, 10.2, 34

[56] References Cited

UNITED STATES PATENTS

| 3,345,752 | 10/1967 | Gabriel | 35/34 UX |
| 3,229,386 | 1/1966 | Schott | 35/34 |

FOREIGN PATENTS OR APPLICATIONS

| 759,516 | 10/1956 | England | 35/12 N |

Primary Examiner—Robert W. Michell
Assistant Examiner—L. R. Oremland
Attorney—Francis L. Masselle, William Grobman and Charles S. McGuire

[57] ABSTRACT

A simplified, mechanical system for arrangement forwardly of the trainee station in a fixed-base vehicle trainer, such as a light aircraft trainer, to enhance training value by providing a visual stimulus related to real-world conditions. Mechanical members are arranged to define a vertically disposed outline which conforms to the apparent shape of an assumed, fixed, horizontally disposed object, such as a runway, when viewed in perspective. Means are provided for moving the mechanical members in accordance with simulated movement of the trainer, thereby giving a visual impression of changes in the trainee's assumed positional viewpoint with respect to the fixed object, as represented by the shape of the outline defined by said mechanical members.

5 Claims, 3 Drawing Figures

Patented July 25, 1972

Robert A. McKnight
INVENTOR.

BY Charles S. McGuire,
Attorney

Patented July 25, 1972

Robert A. McKnight
INVENTOR.

BY Charles S. McGuire
Attorney

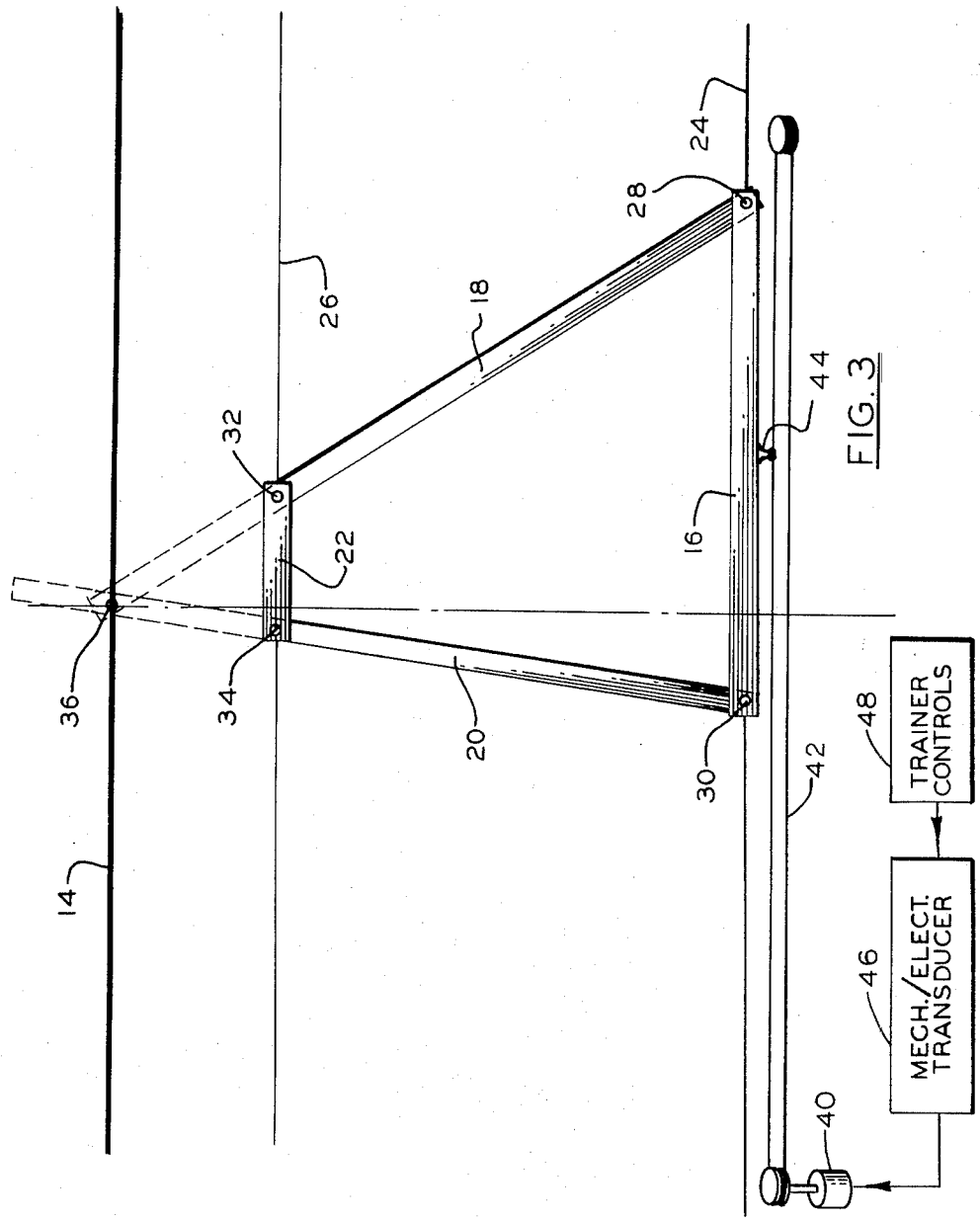

VISUAL TEACHING AIR FOR FIXED-BASE VEHICLE TRAINER

This invention relates to visual teaching or training aids useful in conveying the impression of a change in positional viewpoint of the trainee with respect to assumed fixed objects represented by the training aid. More specifically, the invention relates to a simple and expedient visual simulation system for use with a fixed-base aircraft trainer and comprising an arrangement of mechanical members defining an outline corresponding to the apparent shape of an aircraft runway, or the like, when viewed in perspective from an actual aircraft during a landing approach.

For many years fixed-base vehicle trainers and simulators of varying degrees of complexity have been used to assist in instructing students in certain phases of the operation of actual vehicles. In order to add to the realism of the training, some of these training devices have been equipped with, or used in conjunction with, means giving a visual impression of the actual appearance of certain features of the real world. Such visual simulation systems have been provided in a variety of forms and include systems both with and without means for changing the simulated positioned viewpoint. For example, certain moving picture visual systems are provided with variable optical elements to distort the displayed scene in a controlled manner so that the student's apparent positional viewpoint with respect to the scene is not limited to the path followed by the camera as the scene was photographed. Other visual systems have utilized television displays with the camera moved relative to a terrain model in response to simulated movement of the vehicle trainer.

While visual simulation systems of the types described above have been designed to provide a very high degree of realism, such systems are necessarily very expensive. Therefore, the cost of providing such a system can normally be justified only in connection with large, sophisticated training equipment which is also very expensive. A primary object of the present invention is to provide a simple and inexpensive system which will provide a useful degree of visual stimulus for training purposes, indicating over a limited range apparent changes in the observer's physical viewpoint, for use in conjunction with fixed-base vehicle trainers.

The disclosed embodiment of the invention is applied to certain portions of the training received in a fixed-base flight trainer for light aircraft. One of the principal visual tasks in the operation of such aircraft is to align the path of the plane with the runway during a landing approach. Hence, a training aid which provides a visual stimulus to a student operator of a fixed-base flight trainer is of significant value even through the stimulus is valid for only a very limited portion of the simulated travel. It is normally desirable to align the aircraft's approach path with the centerline or other longitudinal axis of the runway when the plane is several thousand feet distant from the point of intended touchdown and at an elevation of a few hundred feet. When the aircraft is in such a position, the elongated rectangle forming the runway is seen in perspective along its length and a two-dimensional projection thereof on a vertical plane appears as a trapezoid having sides converging from the lower to the upper base. The trapezoid will appear slewed to the right or left depending on the lateral position of the viewer with respect to the runway axis.

The present invention makes use of this fact and provides a trapezoidal array of mechanical members arranged in a substantially vertical plane forwardly of the aircraft trainer for viewing by the student pilot. The proportions of the trapezoid and its distance from the trainer are such that the appearance is similar to that of a runway seen in perspective along its length from a distance and at an altitude roughly equivalent to that at which alignment at an actual aircraft with the runway should be accomplished. Means are provided for moving the lower base of the trapezoidal array toward the left or right in accordance with the student's movement of the simulated controls which would affect lateral movement of an actual aircraft. The sides and upper base are so connected to one another and the lower base that lateral movement of the latter slews the trapezoid to the left or right. This provides one apparent degree of freedom in the relative movement of the simulated aircraft and runway and represents the most basic embodiment of the invention. Additional means may be provided, as desired, for moving mechanical members either independently or cooperatively to provide other apparent degrees of freedom in cases where the added training value derived therefrom is sufficient to justify the cost.

Other objects of the invention will in part be obvious and will in part appear hereinafter.

The invention accordingly comprises the features of construction combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 3 is also an elevational view showing the apparatus of FIG. 2 in a second position.

Figure 1:
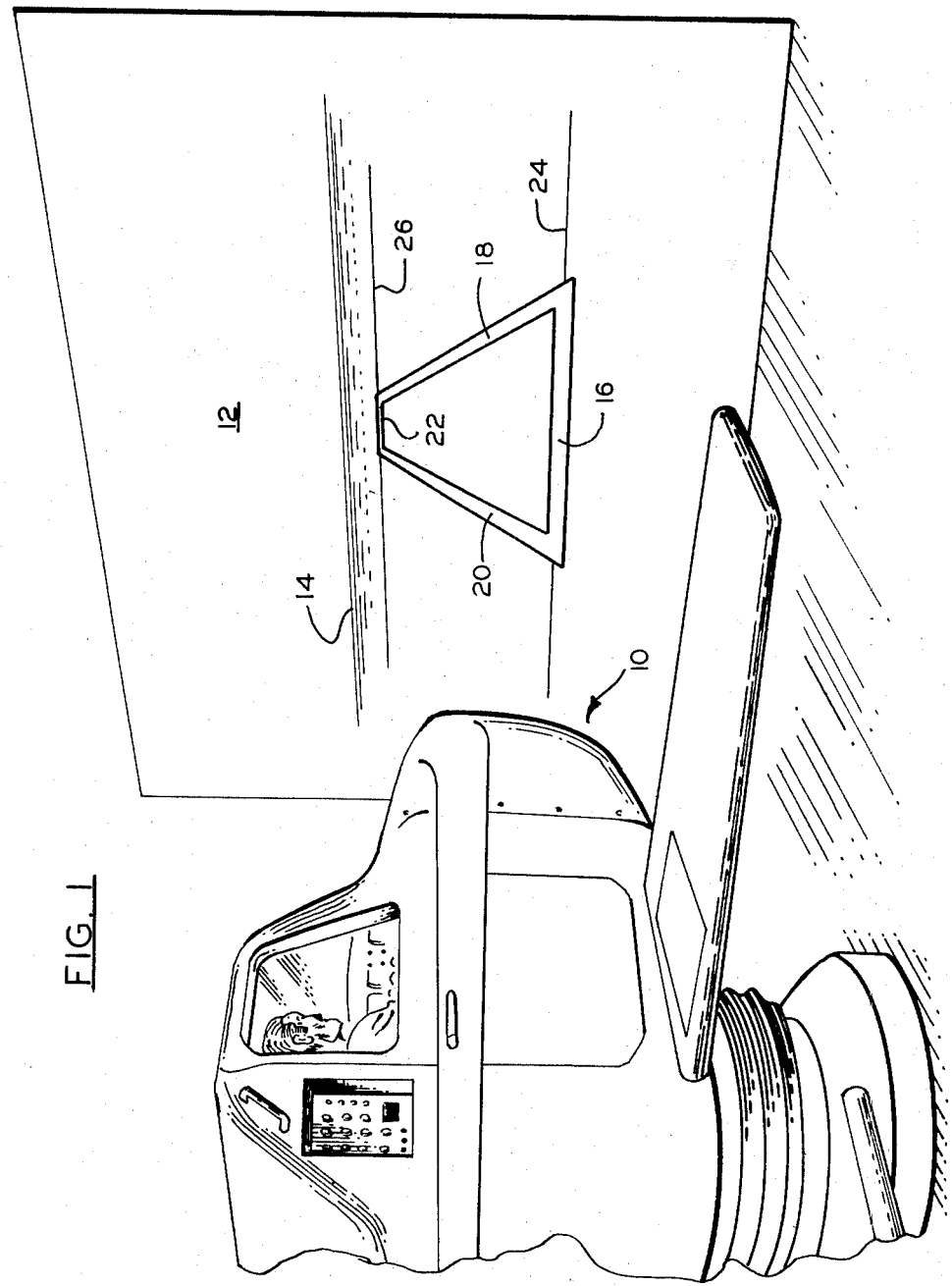
FIG. 1 is a perspective view showing a typical general aviation flight trainer with a visual display of the type contemplated by the present invention positioned forwardly thereof.

The general environment of a preferred form of the invention is illustrated in FIG. 1 which shows a conventional light aircraft trainer 10 positioned in generally facing relation to a vertical display surface 12. Trainer 10 may be of any well-known design, such as that manufactured and sold by the Link Division of Singer-General Precision, Inc. under the trade designation GAT-1, but the principles of the invention may be applied in connection with a wide variety of such training apparatus, as will be apparent to those skilled in the art. The simulated cockpit of the trainer is mounted on a fixed base, but may be movable relative thereto over a limited range in one or more degrees of freedom by any of a number of well-known motion systems. At any rate, manually operable controls will be provided in the cockpit of trainer 10, simulating those of an actual aircraft so that the student may "fly" the trainer in a manner calculated to provide useful training in certain phases of operation of an actual aircraft.

As previously generally described, the present invention improves the realism of the training by providing a visual reference in teaching new flight students the essence of the runway tracking task during approach and landing. Display surface 12 may be either a stiff or a pliable material and preferably includes means printed or painted thereon to represent a horizon line 14. Arranged upon or directly adjacent surface 12 is an array of pivotally and/or slideably joined bars arranged in the shape of a trapezoid having lower base 16, sides 18 and 20, and upper base 22. The bars are supported on horizontal wires 24 and 26 along which bars 16 and 22, respectively, are slideable.

The trapezoidal array of bars represents the two-dimensional projection on a vertical plane of the apparent shape of a runway seen in perspective from a distance of several hundred feet and looking generally along its length. Bars 16 and 22 represent the near and far runway thresholds, respectively, and bars 18 and 20 represent the sides. For better realism in the simulated perspective, far threshold bar 22 should be proportionately narrower than near threshold bar 16 and side bars 18 and 20 should taper slightly, being narrower at the top.

Figure 2:
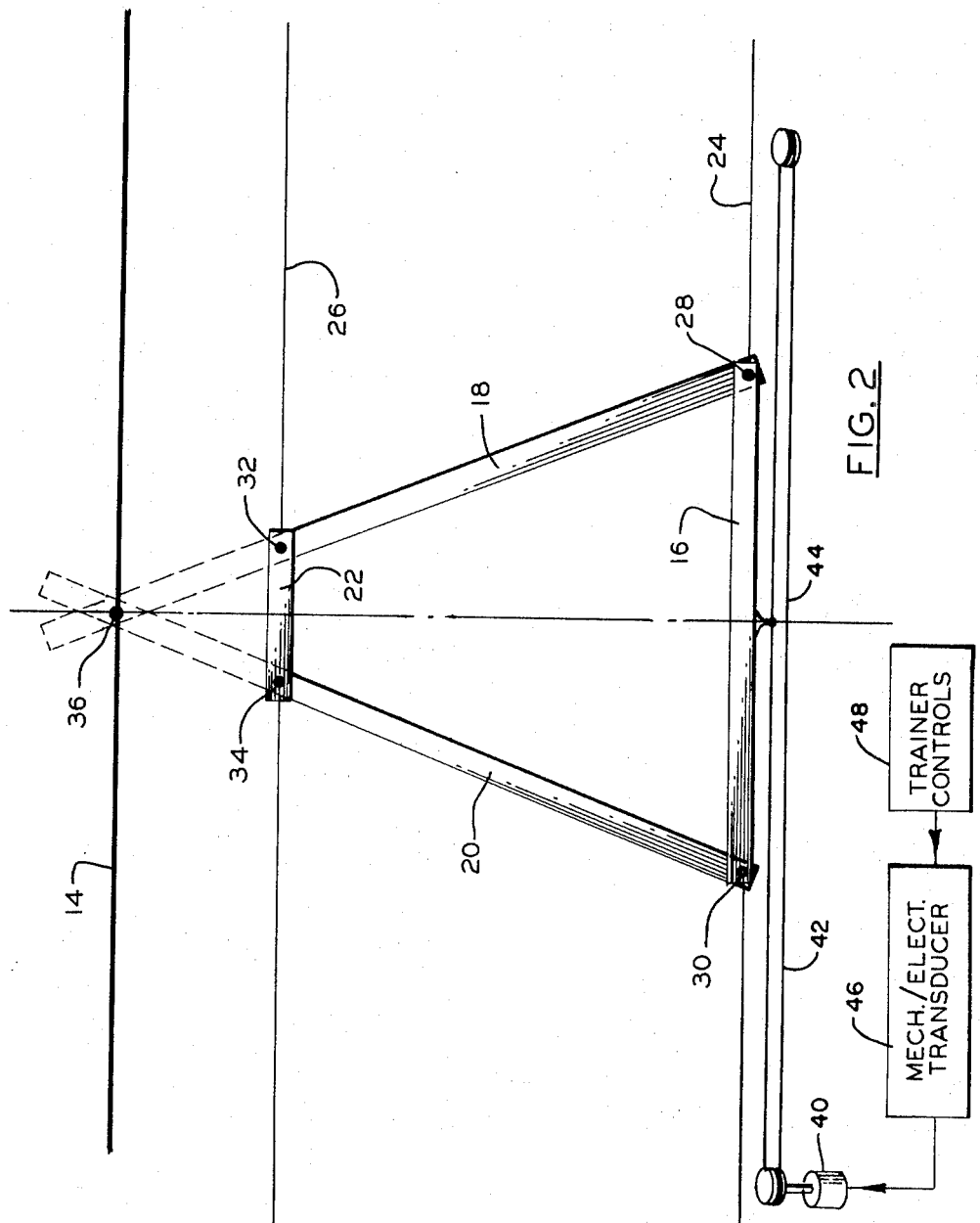
FIG. 2 is an elevational view of one embodiment of the invention shown in a first position.

Turning now to FIG. 2, there is shown a somewhat diagrammatic but more detailed view of the manner in which the array of bars are connected for cooperative movement. As previously mentioned, bar 16 is supported for sliding movement upon wire 24 by any appropriate means, and bar 22 is likewise supported on wire 26. Side bars 18 and 20 are pivotally connected at their respective lower ends to the right and left ends of near threshold bar 16 as indicated at 28 and 30. Reference numerals 32 and 34 denote suitable connections of side bars 18 and 20 to the ends of far threshold bar 22 which allow relative pivotal movement of the connected bars and also allow slideable movement of the side bars longitudinally with respect to their pivot points.

Side bars 18 and 20 extend past their respective connections with far threshold bar 22 and are connected to one another at their point of intersection, denoted by the reference numeral 36. The portions of bars 18 and 20 extending above bar 22 are covered by surface 12, for example by providing a flap arrangement or other opening adjacent and parallel to bar 22. The point of intersection of bars 18 and 20 represents the simulated vanishing point of the runway as seen in perspective and, accordingly, is superposed with simulated horizon line 14. Since the simulated vanishing point should remain fixed at the point of intersection of the horizon and runway centerline, and the lower ends of bars 18 and 20 are mounted for linear movement only, the connection of the bars at point 36 must be pivotal and slideable as with connections 32 and 34. For example, a fixed stud at joint 36 may pass through suitable slotted openings in the bars. The required length and position of the slots will be determined, of course, by the desired amount of lateral movement of the lower ends of bars 18 and 20.

A diagrammatic example of suitable means for driving the array of bars is shown in the form of a servo motor 40 driving an endless belt or wire 42, fixedly connected at 44 to lower horizontal bar 16. Many other equally appropriate drive means could, of course, be used. Motor 40 is powered by electrical signals controlled in both magnitude and direction (phase) by appropriate transducer means 46 having an output governed by the physical position of the trainer controls 48. The latter are shown in block diagram form only, since many examples of trainer controls with simulated heading, velocity, etc. are well known in the art. U.S. application Ser. No. 725,706, now U.S. Pat. No. 3,500,439, for example, describes in detail simulated radio navigation equipment for use in such trainers to generate signals representing runway heading, glide slope, etc.

In FIG. 3 the simulated runway outline is shown as it would appear when the aircraft is laterally spaced to the left of a path aligned with the runway axis. Bar 16 is displaced to the right along support wire 24 from the position of FIG. 2, wherein the outline formed by the array of bars conforms substantially to runway appearance when the simulated position of the trainer is properly aligned with the runway axis. Bar 22 has also been moved linearly to the right, bar 18 has slid downwardly along its mountings at 32 and 36, and bar 20 has slid upwardly at 34 and 36.

Lateral movement of the array in the manner described provides a visual impression of lateral movement of the trainer with respect to the array, thus giving the student a feeling of having moved the path of the simulated aircraft into alignment with the runway axis by manipulation of the trainer controls. It has been found that the training thus derived is effectively transferred to operation of actual aircraft and student proficiency in approach alignment is noticeably enhanced by utilizing the invention.

As mentioned earlier, the disclosed embodiment of the invention provides a visual impression of simulated aircraft movement in only one degree of freedom, i.e., to the left or right of the runway centerline. If desired, additional structure and drive means could be provided to simulate movement in other directions. For example, the entire array of bars and horizontal support means could be mounted for controlled vertical movement to simulate altitude changes. Likewise, means could be provided for cooperatively moving the bars individually to change the size of the outline enclosed thereby, thus simulating changes in the apparent distance to the runway. However, the disclosed embodiment is the simplest and most economical embodiment of the contemplated type of training aid and provides a high degree of effectiveness for the intended function.

I claim:

1. A training aid system for indicating apparent changes in simulated positional viewpoint with respect to an assumed, fixed portion of the earth's surface represented by a visual display portion of said system, comprising, in combination:
   a. a fixed-base aircraft trainer;
   b. an array of mechanical members disposed in a substantially vertical plane forwardly of said trainer and arranged to define a trapezoid, having an upper base narrower than its lower base to simulate the appearance of a runway as viewed in perspective along its length from an elevated position spaced longitudinally therefrom;
   c. the mechanical members defining the sides of said trapezoid extending past said upper base and being pivotally connected at their intersection;
   d. means for deriving electrical signals commensurate with the simulated lateral position of said trainer with respect to the longitudinal axis of said runway; and
   e. means for so moving said mechanical members in response to said electrical signals that the shape of said trapezoid corresponds to the apparent shape of runway viewed in perspective from an actual position bearing the same lateral relation to the runway longitudinal axis as the simulated position of said trainer.

2. The invention according to claim 1 wherein said upper and lower bases of said trapezoid are defined by a pair of said mechanical members which are parallel and horizontally disposed.

3. The invention according to claim 2 wherein said mechanical members are superposed with a viewing surface bearing a visual representation of a simulated horizon line disposed above and substantially parallel with the mechanical member defining said upper base.

4. The invention according to claim 3 wherein said pivotal connection of the mechanical members defining the sides of sides of said trapezoid is in juxtaposition with said horizon line and is fixed as said mechanical members are moved.

5. The invention according to claim 4 and further including means for concealing from the view of a student in said trainer the portions of said mechanical members defining the sides of said trapezoid which extend above said upper base.

* * * * *